Sept. 2, 1924.  1,507,201
J. PATTEN
ACID DISTRIBUTOR
Filed June 12, 1918  5 Sheets-Sheet 1

Witness
Chas. L. Griesbauer.

Inventor
John Patten
By Foster Freeman Watson & Coit
Attorneys

Sept. 2, 1924.

J. PATTEN

ACID DISTRIBUTOR

Filed June 12, 1918   5 Sheets-Sheet 2

Witness
Chas. L. Griestauer

Inventor
John Patten
By Foster Freeman Watson Hoit
Attorneys

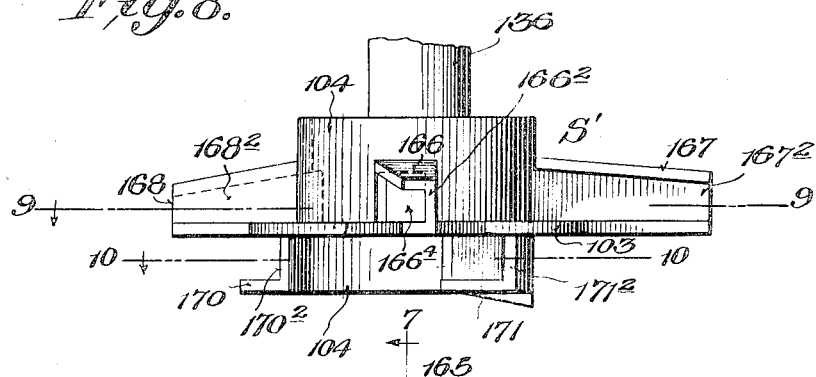
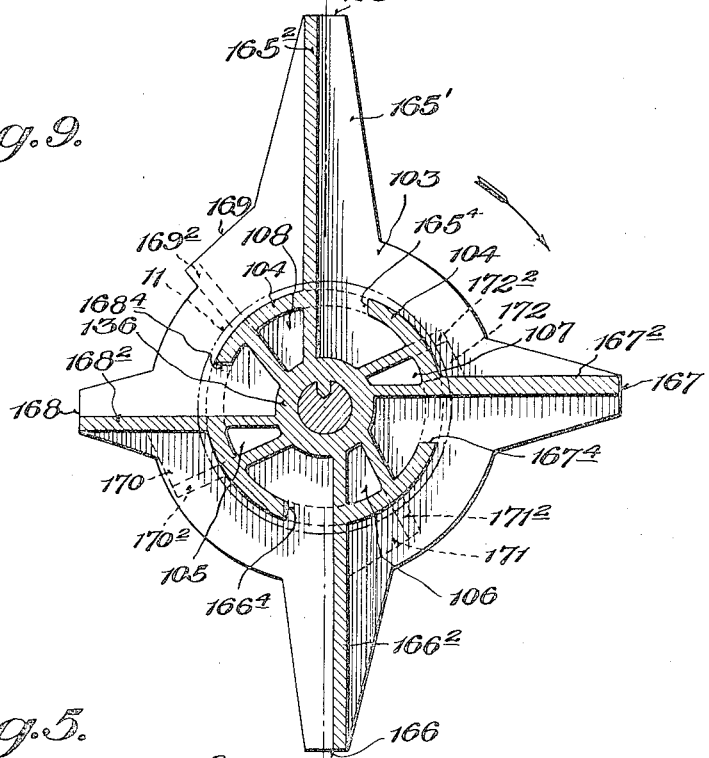
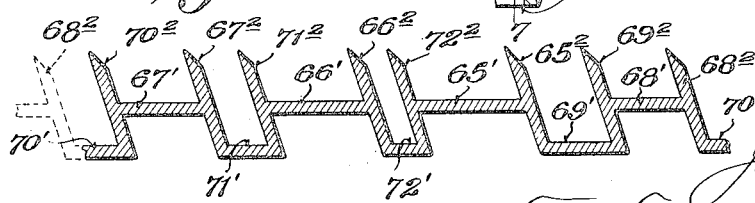

Sept. 2, 1924.  
J. PATTEN  
ACID DISTRIBUTOR  
Filed June 12, 1918 5 Sheets-Sheet 5
1,507,201
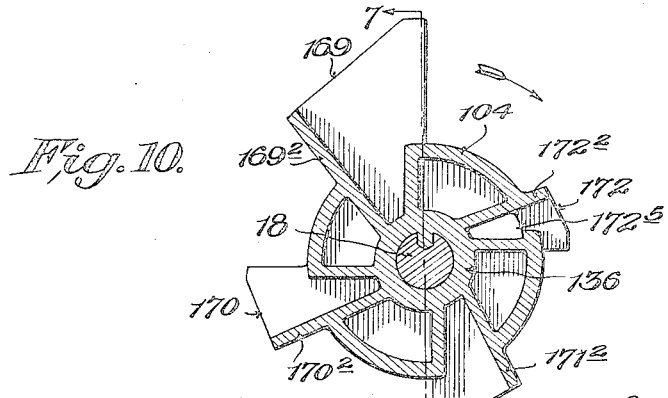
Fig. 10.
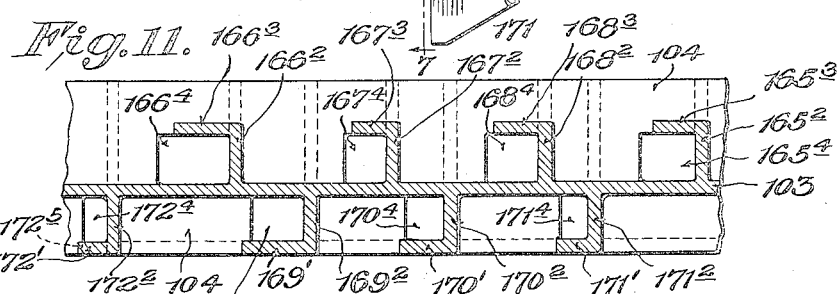
Fig. 11.
Fig. 12.
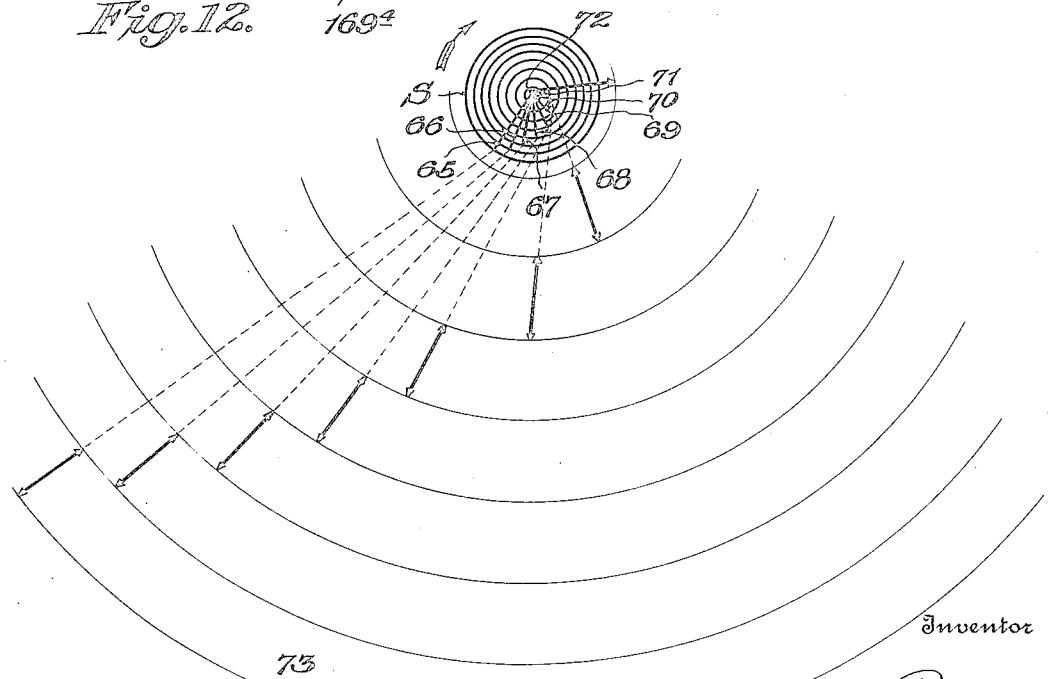
Witness  
Chas. L. Griesbauer
Inventor  
John Patten  
By Foster Freeman Watson Krit  
Attorneys Patented Sept. 2, 1924.

1,507,201

UNITED STATES PATENT OFFICE.

JOHN PATTEN, OF BALTIMORE, MARYLAND, ASSIGNOR TO THE DAVISON CHEMICAL COMPANY, OF BALTIMORE, MARYLAND, A CORPORATION OF MARYLAND.

ACID DISTRIBUTOR.

Application filed June 12, 1918. Serial No. 239,692.

*To all whom it may concern:*

Be it known that I, JOHN PATTEN, a citizen of the United States, and residing at Baltimore, State of Maryland, have invented certain new and useful Improvements in Acid Distributors, of which the following is a specification.

The present invention relates to liquid distributors and more particularly to an apparatus for distributing an acid uniformly over a given area.

In the manufacture of sulphuric acid, the hot gases from the roasted pyrites or sulphur are delivered at the bottom of the Glover tower, and pass upward through the interstices between the loose brick or acid proof stone, with which the tower is filled almost to the top. Strong sulphuric acid holding in solution nitre gas is delivered at the top of the tower and trickles down through the said brick or stone, being heated by the upwardly moving hot gases, thus liberating the nitre gases which unite with the hot furnace gases and pass over into the lead chambers.

It is the principal object of this invention to provide an apparatus, located at the top of the Glover tower, to distribute the acid uniformly over the top of the brick or stone filling. It is to be understood, however, that the invention is not limited to use in a Glover tower, as it may be employed at the top of the Gay Lussac tower. Neither is the invention limited to the distribution of acid, as the concept herein disclosed may be embodied in apparatus for distributing other liquids.

Other objects and features of novelty will be apparent from the description taken in connection with the drawings, in which:—

Figure 3 is an elevation at right angles to the section of Figure 2, certain parts being shown in section;

Figure 4 is a sectional plan view of the distributing head or spider taken substantially on the line 4—4 of Figure 3;

Figure 5 is a developed sectional elevation taken substantially on the circular line 5 of Figure 4;

Figure 8 is an elevation of the distributing head or spider used with the form of the invention illustrated in Figures 6 and 7;

Figure 9 is a sectional plan view taken substantially on the line 9—9 of Figure 8;

Figure 10 is a sectional plan view taken substantially on the line 10—10 of Figure 8;

Figure 11 is a developed sectional view similar to Figure 5 taken on the circular line 11 of Figure 9; and Figure 12 is a diagrammatic view illustrating the principle of operation of the present invention.

Figure 1:
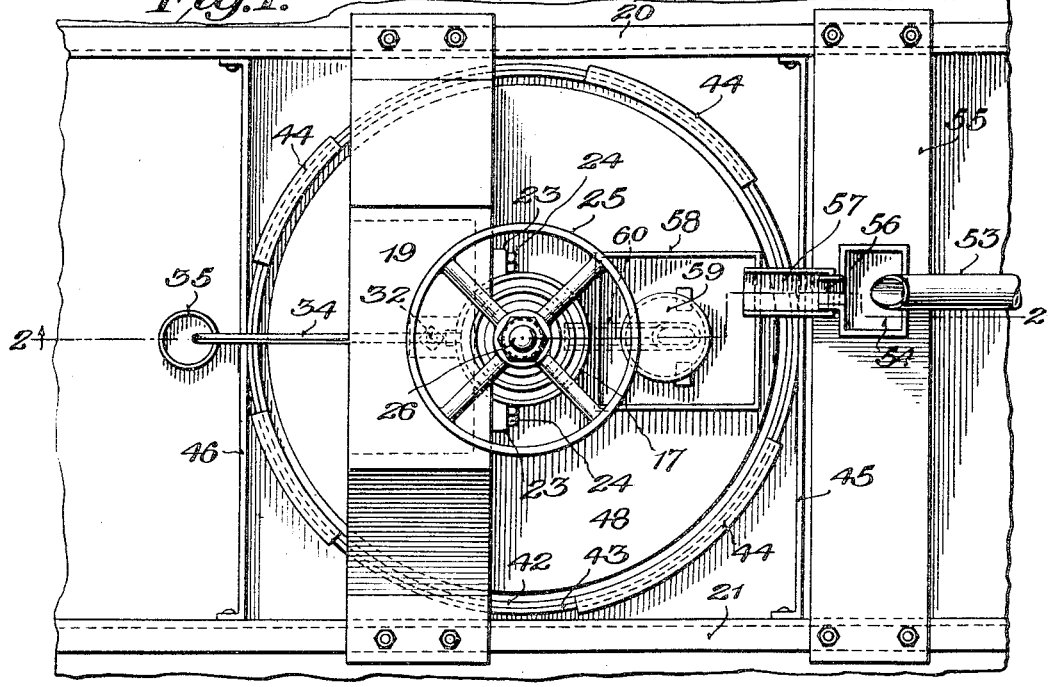
Figure 1 is a top plan view of a distributor constructed in accordance with the present invention.
Figure 2:
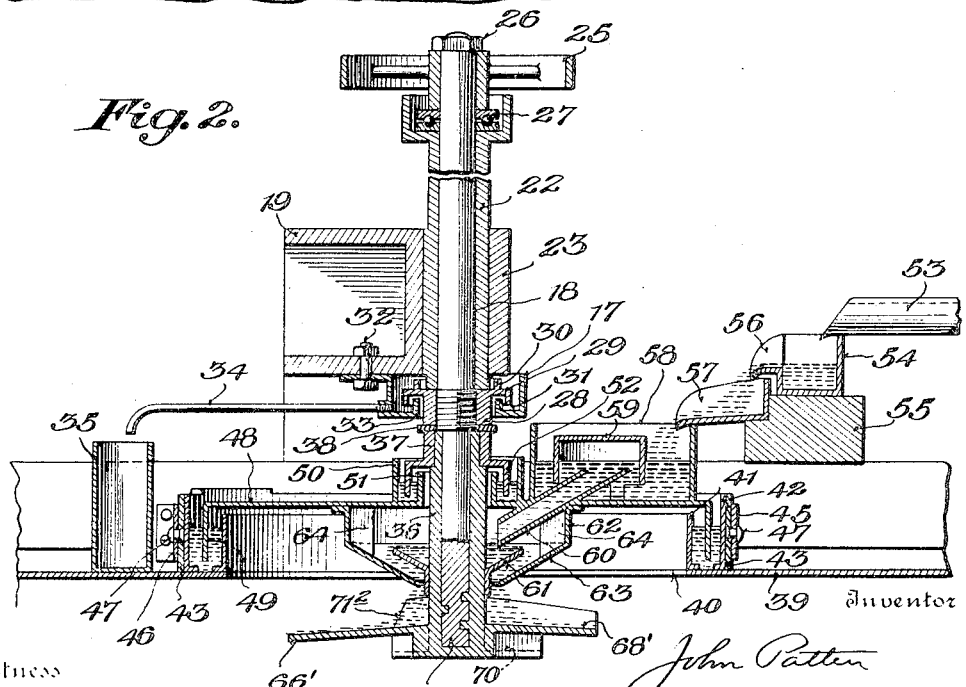
Figure 2 is a sectional elevation taken substantially on the line 2—2 of Figure 1.
Figure 6:
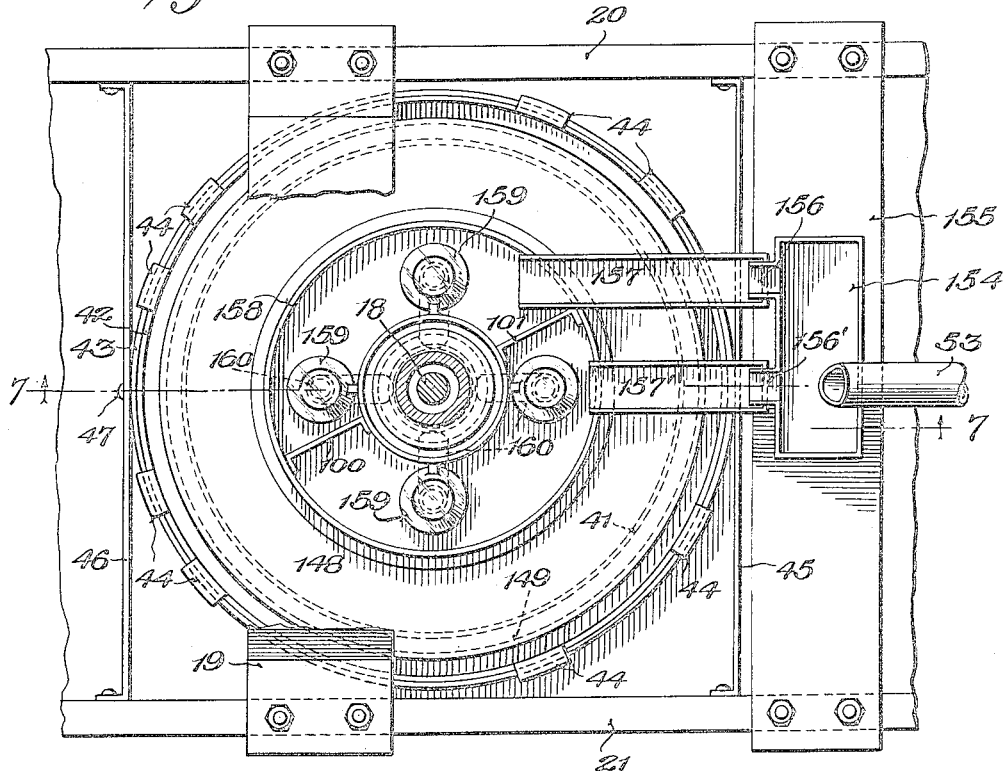
Figure 6 is a plan view similar to Figure 1 showing a modified form of the invention the supporting bracket being broken away and some parts appearing in section.
Figure 7:
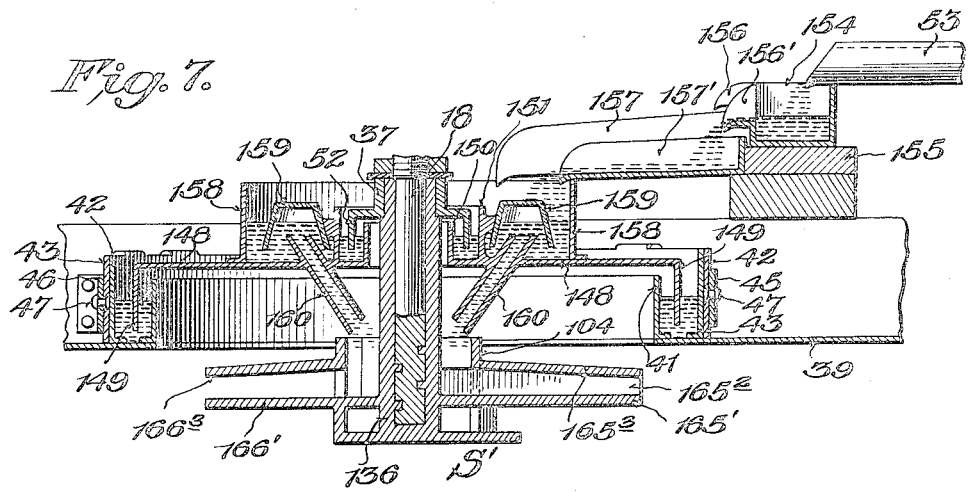
Figure 7 is a sectional elevation taken substantially on the line 7—7 of Figure 6.

Referring to the drawings the reference numerals 20 and 21 indicate two supporting beams arranged at the top of a Glover tower, the present embodiment of the invention being the form used for the purpose of distributing acid at the top of the Glover tower of a sulphuric acid plant. A bracket 19 is mounted on the beams and has a vertical sleeve 22 held against movement by means of a cap or clamp 23 secured to the bracket by the bolts 24. A shaft 18 extends through the sleeve and at its upper end has a driving pulley 25, held in place by means of a nut 26 threaded on the end of the shaft. A roller bearing 27 is interposed between the lower end of the pulley head and the top of the sleeve 22, this bearing being employed to carry the entire weight of the shaft 18 and the parts mounted thereon. Just below the lower end of the sleeve 22, the shaft 18 is threaded and has a collar 28 screwed thereon, this collar having the radially extending flange 29 which is formed with the oppositely extending vertical flanges 30 and 31. An annular housing 17 is secured by means of a bolt 32 to the bracket 19 and has an inner peripheral flange 33 which extends into the annular space between the hub of the collar 28 and the flange 31. This arrangement of parts is provided for the purpose of collecting oil to prevent its passage down the shaft as the oil in conjunction with the acid has a very injurious effect on the lead parts of the apparatus. The housing 17 may be drained by means of conduit 34 discharging into a vessel 35.

A distributing head or spider S is secured to the lower end of the shaft 18 for rotation therewith in any suitable manner. As shown the lower end of the shaft has a plurality of holes drilled therein and the spider with its upwardly extending sleeve or hub 36 is cast on the shaft so that the lead from which the spider is made, flows into and fills the holes in the shaft. The upper end of the hub 36 of the spider is slightly reduced in diameter and has a lead collar 37 thereon. A packing washer 38 is interposed between the sleeve 28, on the one hand, and the upper ends of the sleeve 36 and collar 37 on the other hand, this packing being tightly clamped between the parts by screwing the nut 26 toward the spider. The top of the Glover tower is closed by a lead cover 39 and this cover is formed with the aperture 40 through which the spider may be removed. At the edge of the aperture 40 the cover 39 has a circular upwardly extending lead flange 41 and spaced from this flange is a concentric lead flange 42 of larger diameter. To support the cover adjacent the aperture a steel or iron ring 43 is arranged on the outside of the lead flange 42 and at intervals, if desired, the flange is bent over the top of the ring 43 as indicated at 44, Figure 1. The ring 43 is supported by the cross members 45 and 46 carried by the beams 20 and 21, the ring being connected to these members in any suitable manner as means of the rivets 47.

The opening 40 is closed by a disk 48 which has a downwardly extending flange 49 at its outer periphery arranged between the concentric flanges 41 and 42. At its inner periphery the annular disk 48 which is of lead has the spaced concentric flanges 50 and 51 and a flange 52 on the collar 37 extends into the annular space between the said flanges 50 and 51. The spaces between the flanges 41 and 42 and between the flanges 50 and 51 are filled with the acid so that a gas tight connection is formed between all these parts.

The acid which is to be distributed over the top of the filling in the Glover tower is supplied as by means of a conduit 53 to the receptacle 54 carried by a beam 55 supported on the beams 20 and 21. The acid in the receptacle 54 is discharged through a spout 56 into the removable trough 57 which in turn discharges into a receptacle 58 on the top of the disk 48. An inverted cup 59 is arranged within the receptacle 58 and has its open end spaced from the disk 48. An inclined conduit 60 has one end opening within the cup 59 and the other end discharging at a point adjacent the sleeve 36 of the spider. Just below this discharging end of the conduit the sleeve 36 has the upwardly extending conical flange 61 into which the acid fed by the conduit 60 discharges. Outside the flange 61 is a shell member which comprises the cylindrical shell 62 secured to the underside of the disk 48 and the conical flange 63 which is arranged substantially parallel to the flange 61 and has its lower peripheral edge concentric with and slightly spaced from the sleeve 36 of the spider. Extending inward from the cylindrical portion 62 are a plurality of webs or blades 64 for a purpose presently to be mentioned.

From the foregoing it will be seen that the acid fed through the conduit 53 is carried to the receptacle 58 and then flows through conduit 60 being delivered against the sleeve 36 of the spider. The rotation of the conical sleeve 61 causes acid to move radially outward where it encounters the blades 64 which break up or stop the circular action. The acid then flows down the conical flange 63 and is discharged in an annular sheet onto the spider or distributing head. As the upper end of the conduit 60 is higher than the lower edge of the cup 59 the arrangement of these parts provides a fluid seal which prevents any gas from passing out through the said conduit. It will be observed further that the spider and the disk 48 and associated parts may be removed by an upward movement through the opening 40, the trough 57 having first been removed.

Referring now to Figures 2, 3, 4 and 5, it will be seen that the spider comprises a plurality of arms of different lengths and further the arms are arranged in two groups the arms 65, 66, 67 and 68 of one group having their discharge ends at a higher elevation than the arms 69, 70, 71 and 72 of the other group. Further, the arms constituting the upper group are all longer than any of the arms constituting the lower group. These arms are constructed to form substantially radial discharging channels for the acid and for this purpose each arm has a bottom and an inclined side wall. Thus the arm 65 has the bottom wall $65'$ and the side wall $65^2$, this latter wall being inclined with respect to the bottom wall $65'$. The acid or fluid which is fed to the spider is thus discharged from the ends of the arms or channels, the longer arms giving to the fluid a greater velocity than the shorter arms. It will be observed that the fluid will be discharged from the end of the arms in a direction which is a resultant of the tangential velocity at the end of the arm and the velocity of outward movement of the fluid along the arm. Referring now to Figure 12, 73 indicates the cylindrical shell of a Glover tower and the spider or distributing head S is arranged at the center thereof. The arms of the spider are constructed and arranged so that the longest arm will distribute the fluid to an annular area bounded on the outside by the shell of the tower. The next longest arm will distribute the fluid to an annular area bounded on the outside by the inner periphery of the first mentioned area. Thus each arm supplies an annular area, the areas near the center of the tower being smaller than those further out. For this reason the longest arm which supplies the largest area must have more fluid fed to it than the other arms. As the areas which the arms supply are substantially in proportion to their lengths, the acid supplied to the arms should be in substantially the same proportion. This is accomplished by having the circular distance between the side walls of adjacent arms near the hub of the spider proportional to the length of the corresponding arm. Thus the said circular distance between the side walls $65^2$ and $72^2$, which is the feed opening for the longest arm 65, is the greatest. In a similar manner the circular distance between the side walls $72^2$ and $66^2$ which determines the feed for the shortest arm 72 is the shortest distance. The relative distances between the side walls of adjacent arms is clearly shown in the developed sectional view of Figure 5. The bottoms of the arms are shown at 66′, 67′, 68′, 69′, 70′, 71′, and 72′, the corresponding side walls having the same reference numeral with the index 2. The top edges of the walls of the arms adjacent the hub of the spider are beveled to form sharp edges so as to afford as little resistance to the annular stream of acid fed thereto as possible.

In the operation of the device the spider is rotated at a proper speed to have acid discharged from the ends of the arms at a proper velocity to be distributed over the corresponding annular areas. The arms of a spider which rotates at a relatively low speed may be disposed so that all discharge in a single horizontal plane. At higher speeds however the acid discharged from a short arm might be struck by the succeeding long arm. For instance, referring to Figure 4, with the spider revolving in the direction indicated by the arrows which is the direction for which it is designed it is very clear that the discharge from arm 72 would be struck by the arm 65 if the two arms were in the same horizontal plane. Hence the arms may be disposed in one or more planes only such a number of arms being employed in any one horizontal plane as will operate without interference one with the other. As shown, there are four arms discharging at the upper elevation and four at the lower. Furthermore, the longest arm of the lower group is shorter than the shortest arm of the upper group and all of the arms decrease in length progressively from the longest arm to the shortest arm.

In the operation of the apparatus the spider is rotated at the proper speed by a belt on the pulley 25 and acid is supplied through the conduit 53 being delivered to the distributor head in an annular sheet from the conical flange 63. As previously described, each of the spider arms receives a quantity of acid in proportion to the area which it is designed to spray with the acid. It will be observed that the apparatus is constructed so that the head may be removed through the aperture 40 and, furthermore, gas tight joints are provided between the various parts so that none of the gas within the tower can escape.

In Figures 6 to 11 inclusive, another form of the invention is illustrated. This construction is the same as the apparatus already described, excepting that the spider and means for feeding the acid are somewhat different.

The shaft 18 carries the modified spider S′ and is supported in the same manner as is described in connection with the first form of the invention. The top of the tower is closed by the lead cover 39 formed with the aperture 40 and the circular upwardly extending lead flanges 41 and 42, a steel or iron ring 43 being arranged on the outside of the lead flange 42 and the latter at intervals being bent over the top of said ring as indicated at 44. The ring 41 is supported by the cross members 45 and 46 carried by the beams 20 and 21, the ring being connected to these members in any suitable manner, as by means of the rivets 47.

The opening 40 is closed by a disk 148 similar to the disk 48 previously described and has a downwardly extending flange 149 at its outer periphery arranged between the concentric flanges 41 and 42. At its inner periphery the annular disk 148 which is of lead has the spaced concentric flanges 150 and 151, and the flange 52 on the collar 37 extends into the annular space between the said flange 150 and 151.

The acid which is to be distributed is supplied through a conduit 53 to the receptacle 154 supported on a beam 155 and having the two discharge spouts 156, 156′ which deliver the acid into the removable troughs 157 and 157′, respectively. Concentric with the flange 151 and spaced radially outward therefrom is a flange 158 on the disk 148. The annular chamber thus formed between the flanges 151 and 158 is divided into two parts by partitions 100 and 101, the trough 157 delivering acid into one part and the trough 157′ delivering acid into the other. Two inverted cups 159 are arranged in each of the parts of the said chamber and each cup has its open end spaced from the disk 48. A plurality of inclined conduits 160, one for each cup, have their upper ends opening within the cups 159 and their lower ends discharging at a point adjacent the sleeve 36 of the spider.

The spider or distributor head of this form of the invention comprises a plurality of arms of different lengths arranged in two groups, the arms 165, 166, 167, and 168 of one group having their discharge ends at a higher elevation than the arms 169, 170, 171 and 172 of the other group. The arms are constructed to form substantially radial discharging channels for the acid and for this purpose each arm has a bottom, a side wall, and a top wall, one side being open. Thus the arm 165 has the bottom wall 165', side wall $165^2$, and the top wall $165^3$. In a similar manner the corresponding walls of each of the arms are indicated by the indexes 1, 2 and 3. The bottoms of the arms of the upper group radiate from a disk 103 and spaced from the upper sleeve 136 of the spider is a vertical cylindrical wall 104 of less diameter than said disk. The side walls of the arms are extended between the wall 104 and the hub 136 of the spider, thus dividing the annular space between these parts into a plurality of chambers, these chambers being proportional in size to the length of the respective arms. Thus each chamber will receive a quantity of acid in proportion to the length of the arm which it supplies. In order to allow the acid to pass from the chamber to the associated arm the wall 104 is formed with apertures. Thus the wall 104 between the arms 165 and 172 is formed with the aperture $165^4$ whereby acid passes outward along the channel formed by the arm 165. In the same manner each arm has an aperture in the wall 104 indicated by the reference numeral of the arm with the index 4. The arms 169, 170, 171 and 172 are at a lower elevation than the arms of the other group and in order to permit the acid to pass to this lower group of arms the disk 103 is cut away at 108, 105, 106, and 107. The wall 104 at its lower elevation is formed with apertures one for each arm in the same manner as at the upper elevation. It will be seen therefore that each of the arms is supplied with a quantity of acid proportional to the area which the arm is designed to supply with acid. If desired, in order to distribute acid to the area immediately adjacent the axis of the spider the shortest arm 173 may be formed with an aperture $172^5$ in the bottom thereof.

The operation of this form of the invention is the same as that previously described.

The first form is preferred for the reason that the spider of the second construction is more difficult to cast and also for the reason that the enclosed form of channels of the latter form afford the greater opportunity for iron sulphide to collect and harden.

The distributor head or spider is usually a casting made from an alloy of lead or antimony and as previously described is preferably cast on the driving shaft 18. The spider may also be cast from an alloy of iron and silicon known commercially as duriron. This latter material is hard and can be ground. If the spider is made from this material therefore the means of preventing egress of gas from the tower may be modified.

Although two forms of the invention have been described specifically it is understood that the invention is not limited to the exact structure illustrated but includes changes and modifications which come within the scope of the appended claims.

Having thus described the invention what is claimed as new and desired to be secured by Letters Patent is:—

1. Apparatus of the character described adapted to distribute acid uniformly over the cross sectional area of a Gay Lussac or Glover tower including in combination a rotatable spider formed with a plurality of radiating acid channels of different lengths, the longest channel arranged to discharge the acid at a higher elevation than the shortest channel, means for delivering acid to said channels in quantities proportional to the length of said channels, and means for rotating said spider.

2. Apparatus of the character described adapted to distribute acid uniformly over the cross sectional area of a Gay Lussac or Glover tower including in combination a rotatable spider formed with a plurality of radiating acid channels of different lengths, means for delivering acid to said channels adjacent the center of the spider, and means for rotating said spider, the channels being arranged in groups, the channels of one group being disposed to discharge the acid at a higher elevation than the channels of another group.

3. Apparatus of the character described adapted to distribute acid uniformly over the cross sectional area of a Gay Lussac or Glover tower including in combination a rotatable spider formed with a plurality of radiating acid channels of different lengths, means for delivering acid to said channels adjacent the center of the spider, and means for rotating said spider, the channels being arranged in groups, the shortest channel of one group being longer than the longest channel of another group, the channels of said first group being disposed to discharge the acid at a higher elevation than the channels of the second group.

4. Apparatus of the character described adapted to distribute acid uniformly over the cross sectional area of a Gay Lussac or Glover tower including in combination, a vertical shaft, means for rotating said shaft, and means secured to said shaft constructed and arranged to discharge acid at a plurality of points at different velocities, said discharge points being disposed in at least two horizontal planes, the velocity of discharge of the points at the higher elevation being greater than the lower elevation.

5. The combination with a closed vessel, of a liquid distributor at the top thereof including a vertical shaft having a head at the lower end thereof, the top of the vessel having an opening for removal of said head, an annular cover closing said opening having a loose gas tight connection at its outer periphery with said top and at its inner periphery with said shaft, and means to supply said head with liquid from outside the vessel constructed and arranged to prevent egress of gas from said vessel.

6. The combination with a closed vessel, of a liquid distributor at the top thereof including a vertical shaft having a head at the lower end thereof, the top of the vessel having an opening for removal of said head, an annular cover closing said opening having a loose gas tight connection at its outer periphery with said top and at its inner periphery with said shaft, and means to supply said head with liquid from outside the vessel constructed and arranged to prevent egress of gas from said vessel, said means including a receptacle, a conduit extending from said receptacle through said cover, and an inverted cup in said receptacle spaced from the bottom thereof, the upper end of said conduit being disposed in said cup.

7. Apparatus of the character described adapted to distribute acid uniformly over the cross sectional area of a Gay Lussac or Glover tower including in combination, a plurality of devices each adapted to deliver acid over an annular portion of said area, said portions varying in size, and means to feed liquid to each of said devices in quantities proportional to the annular portion over which it distributes the same.

8. Apparatus of the character described adapted to distribute acid uniformly over the cross sectional area of a Gay Lussac or Glover tower including in combination, a shaft, a member rotatable with said shaft having radiating arms of different lengths constructed and arranged to distribute acid from their outer ends, means to rotate said shaft, and means to feed acid to said arms in quantities proportional to the areas over which they distribute the liquid.

9. Apparatus of the character described adapted to distribute acid uniformly over the cross sectional area of a Gay Lussac or Glover tower including in combination, a shaft, a member rotatable with said shaft having radiating arms of different lengths constructed and arranged to distribute acid from their outer ends, the ends of the longer arms being at a higher elevation than the shorter arms, means to rotate said shaft, and means to supply said ends with acid in quantities proportional to the areas over which they distribute the same.

In testimony whereof I affix my signature.

JOHN PATTEN.